(12) United States Patent
Tanaka et al.

(10) Patent No.: US 7,556,469 B2
(45) Date of Patent: Jul. 7, 2009

(54) REVOLVING-FRAME STRUCTURE OF CONSTRUCTION MACHINERY

(75) Inventors: Nozomu Tanaka, Tsuchiura (JP); Yasuo Koide, Niihari-gun (JP); Hiroyuki Isobe, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 321 days.

(21) Appl. No.: 10/563,215

(22) PCT Filed: Jul. 6, 2004

(86) PCT No.: PCT/JP2004/009890

§ 371 (c)(1),
(2), (4) Date: Apr. 26, 2006

(87) PCT Pub. No.: WO2005/003467

PCT Pub. Date: Jan. 13, 2005

(65) Prior Publication Data

US 2006/0285963 A1    Dec. 21, 2006

(30) Foreign Application Priority Data

| Jul. 7, 2003 | (JP) | 2003-271468 |
| Jul. 7, 2003 | (JP) | 2003-271472 |
| Jul. 7, 2003 | (JP) | 2003-271478 |
| Jul. 7, 2003 | (JP) | 2003-271484 |

(51) Int. Cl.
*B66C 23/00* (2006.01)
(52) U.S. Cl. .......... 414/687; 29/281.5; 29/464; 296/29; 403/231; 403/232.1; 403/237; 414/680

(58) Field of Classification Search ............... 414/680, 414/685, 686, 687; 403/231, 232.2, 237, 403/242; 296/29; 280/799; 180/312; 29/281.5, 29/463, 464, 527.1, 897.2
See application file for complete search history.

(56) References Cited

U.S. PATENT DOCUMENTS 6,168,368 B1 * 1/2001 Apgar et al. ............... 414/686

(Continued)

FOREIGN PATENT DOCUMENTS

JP    05-098665 A    4/1993

(Continued)

OTHER PUBLICATIONS

International Search Report dated Aug. 31, 2004 (seven (7) pages).

*Primary Examiner*—Donald Underwood
(74) *Attorney, Agent, or Firm*—Crowell & Moring LLP

(57) ABSTRACT

A swivel frame structure for a hydraulic excavator, said swing frame structure being to be arranged in a swing upperstructure 21, has a center frame 1 composed of side plates 6,7 and a reinforcement plate 8 joined to each other. The swing frame structure is provided with mating portions for bringing the side plates 6,7 and the reinforcement plate 8 into engagement with each other. These mating portions comprise plug-in structure portions, which in turn comprise holes 6a,7a formed through the respective side plates 6,7 and lugs 8a,8b arranged on opposite side edge portions of the reinforcement plate 8 and to be inserted into the holes 6a,7a of the corresponding side plates 6,7. The center frame can be fabricated without needing any jigs for fixedly holding the side plates and a bottom plate together.

6 Claims, 15 Drawing Sheets

U.S. PATENT DOCUMENTS 6,691,392 B2 * 2/2004 Savoy et al. ............ 29/407.09
6,860,706 B2 * 3/2005 Godwin et al. ............ 414/723

FOREIGN PATENT DOCUMENTS

| JP | 2719469 B2 | 11/1997 |
| JP | 10-292428 A | 11/1998 |
| JP | 2000-064353 A | 2/2000 |
| JP | 2000-240102 A | 9/2000 |
| JP | 2003-082705 A | 3/2003 |
| JP | 2003-129521 A | 5/2003 |

* cited by examiner

REVOLVING-FRAME STRUCTURE OF CONSTRUCTION MACHINERY

TECHNICAL FIELD

This invention relates to a swing frame structure for construction machinery such as a hydraulic excavator. The swing frame structure is to be arranged in a swing upperstructure of the construction machinery.

BACKGROUND ART

FIG. 12 is a perspective view of a hydraulic excavator shown as an example of construction machinery. In this hydraulic excavator, a swing upperstructure 21 is arranged on a travel base 20, and this swing upperstructure 21 is provided with a swing frame 22 to which the present invention is applied.

As a conventional structure of the swing frame 22, one illustrated in FIGS. 13 and 14 has been proposed, for example. FIG. 13 is a plan view, while FIG. 14 is a side view. The conventional swing frame structure shown in these FIGS. 13 and 14 is provided at a front position thereof with a center frame 23 and at a rear position with a tail frame 24. The center frame 23 is provided with a bottom plate 25, a pair of webs, in other words, side plates 26,27 arranged upright on the bottom plate 25 and joined to the bottom plate 25 by welding, and a plate member, in other words, a reinforcement plate 28 joined by welding between these side plates 26 and 27.

In a conventional technology with the center frame 23 constructed as mentioned above, the fabrication of the center frame 23 generally requires a large jig to fixedly hold the paired side plates 26,27 in addition to a jig for fixedly holding these side plates 26,27 and the reinforcement plate 28. In the state that the paired side plates 26,27 and the reinforcement plate 28 are held by the jig as mentioned above, the paired side plates 26,27 tend to move so that as mentioned above, an additional jig is required to position and fixed hold these side plates 26,27 and the bottom plate 25 relative to each other. In the state that the side plates 26,27, the reinforcement plate 28 and the bottom plate 25 are fixedly held and positioned by the respective jigs, they are subjected to tack welding, and subsequent to final positional adjustments, these side plates 26,27, reinforcement plate 28 and bottom plate 25 are subjected to final welding to integrate them together so that the center frame 23 can be completed.

The tail frame 24, on the other hand, is provided with a pair of frame members 29,30. Lateral beams 31,32 are arranged between these frame members 29 and 30, and are joined to these frame members 29,30. The frame members 29,30 are provided with side plates 29a,30a, to which the lateral beams 31,32 are joined, and upper flanges 29b,30b located on these side plates 29a,30a, respectively. On the lateral beams 32,32, discrete brackets can be mounted to permit the fixed installation of an engine.

FIG. 15 diagrammatically illustrates a connection structure between an upper flange of an I-beam, in other words, a frame member, which constitutes the tail frame arranged in the swing frame structure depicted in FIG. 13, and the side plate which constitutes the center frame, in which FIG. 15(a) is a fragmentary plan view while FIG. 15(b) is a fragmentary side view. It has been a common conventional practice, for example, that a front end face of the upper flange 30b of the frame member 30, which constitutes the tail frame 24, and the side plate 27, which constitutes the center frame 23, are joined together by a weld portion 33 as shown in FIGS. 15(a) and 15(b). As illustrated in FIG. 15(a), this weld portion 33 is formed between abutting portions of the front end portion of the upper flange 30b an the side plate 27, and as depicted in FIG. 15(b), is also formed between the front end portion of the upper flange 30b and a side wall of the side plate 27. This applies equally to the unillustrated joint portion between the upper flange 29b and the side plate 26 which constitutes the center frame 23. It is to be noted that L1 shown in FIG. 15(a) indicates the dimension of a bead extension set to assure sufficient joint strength between the flame member 30 and the side plate 27 of the center frame 23. In particular, the weld portions 33 formed on the side walls of the side plates 26,27 of the center frame 23 are generally formed by manually performing clad welding many times and then applying grinder finishing into tapered shapes while following the shapes of the upper flanges 29b,30b. It is to reduce the concentration of a stress at the weld portions 33, in other words, the welded and joined portions that the grinder finishing is performed into the tapered shape conforming with the shapes of the upper flanges 29b,30b (see, for example, Patent Document 1-JP-B-2719469).

As another conventional technology, there is a swing frame structure that engine-fixing brackets are formed integrally with the above-mentioned lateral beams 31,32 to provide frame-side brackets, namely, engine brackets. The engine brackets constructed as mentioned above are each arranged between a pair of frames, specifically I-beams and joined to these frame members by welding (see, for example, Patent Document 2-JP-A-2000-064353).

The above-mentioned conventional technology disclosed in Patent Document 2 has a merit that it requires a smaller number of members than the conventional technology disclosed in Patent Document 1, but upon fabrication of the tail frame 24, it requires a jig for fixing the paired I-beams and the engine brackets in a state that the engine brackets are positioned between these I-beams. As described above, in the state that the I-beams and the engine brackets are fixedly held and positioned by a jig, the side walls of the I-beams and the engine brackets are subjected to tack welding, and by final welding, these I-beams and engine brackets are integrated together to complete a tail frame.

DISCLOSURE OF THE INVENTION

In the conventional technology disclosed in Patent Document 1, the paired side plates 26,27 and the reinforcement plate 28 are held together merely via face-to-face contacts. Even in the state that the side plates 26,27 and the reinforcement plate 28 are fixedly held by a jig, the side plates 26,27 and the reinforcement 28, therefore, tend to move relative to each other. Upon arranging and positioning on the bottom plate 25 the side plates 26,27 and reinforcement plate 28 held together by the jig, an additional large jig is hence needed to fixedly hold the paired side plates 26,27 and the bottom plate 25 as mentioned above. The conventional technology is, therefore, accompanied by a problem in that many jigs are needed to result in a higher fabrication cost for these jigs. Moreover, the above-mentioned jig for holding the side plates 26,27 and the bottom plate 25 together are large in dimensions. The conventional technology, accordingly, involves another problem in that the jig is cumbersome to handle, requires a large space as its storage space, and is prone to an increase in the jig maintenance and management cost.

The present invention has been completed in view of such circumstances of the conventional art. A first object of the present invention is, therefore, to provide a swing frame structure for construction machinery, which makes it possible to fabricate a center frame without needing any jig for fixedly holding side plates and a bottom plate together.

The conventional technology disclosed in Patent Document 1, on the other hand, requires grinder finishing to remove parts of a portion overlayed by clad welding after clad welding is manually performed as mentioned above upon welding and joining the upper flanges 29b,30b of the frame members 29,30, which constitute the tail frame 24, and the side plates 26,27, which constitute the center frame 23, together. This conventional technology is, therefore, accompanied by a problem in that the grinder finishing leads to an increase in manhour and hence, to a rise in fabrication cost.

The present invention has been also completed in view of such circumstances of the above-mentioned conventional technology. A second object of the present invention is, therefore, to provide a swing frame structure for construction machinery, which makes it possible to assure sufficient joint strength without needing any grinder finishing upon welding and joining upper flanges of frame members, which constitute a tail frame, and side plates, which constitute a center frame, together.

In addition, the conventional technology disclosed in Patent Document 2 requires a jig for fixedly holding the side plates of a pair of I-beams and engine brackets together. Although this conventional technology have a merit in that it can reduce the number of members in comparison with the conventional technology disclosed in Patent Document 1 as mentioned above, it is accompanied by a problem that, because it requires a special jig, the fabrication of the jig needs the expense of a cost and results in a higher cost for the fabrication of the tail frame 24. Moreover, the jig has large dimensions so that it is cumbersome to handle and it requires a large space as its storage space.

The present invention has been also completed in view of such circumstances of the above-mentioned conventional technology. A third object of the present invention is, therefore, to provide a swing frame structure for construction machinery, which makes it possible to fabricate a tail frame without needing any jig for fixedly holding engine brackets and frame members together.

To achieve the first object, the present invention provides in a first aspect thereof a swing frame structure for construction machinery, said swing frame structure being to be arranged in a swing upperstructure and having a center frame composed of side plates and a reinforcement plate joined each other, wherein the swing frame structure is provided with mating portions for bringing the side plates and the reinforcement plate into engagement with each other such that the side plates and the reinforcement plate are positioned relative to each other. When constructed as described above, upon fabrication of the center frame, the side plates and the reinforcement plate can be fixed together by a predetermined jig in the state that the side plates and the reinforcement plate are maintained in engagement with each other via the mating portions and are positioned relative to each other. As a consequence, the reinforcement plate and the side plates can be formed into a firmly-integrated unit via the mating portions and the jig. Arrangement of the side plates and reinforcement plate, which have been formed into the firmly-integrated unit as mentioned above, on a bottom plate makes it possible to stably mount and position the integrated unit, which includes these side plates and reinforcement plate, on the bottom plate. Different from the conventional art, a large jig is thus no longer needed to hold the side plates and bottom plate together prior to the initiation of welding upon fabrication of the center frame. Compared with the conventional art, the cost required for such jigs can be reduced, no consideration is needed as to the handling of a jig for holding the side plates and the bottom plate together or its storage space, and the maintenance and management cost for jigs required for the overall fabrication of the center frame can be reduced.

In the swing frame structure, the mating portions may comprise, for example, plug-in structure portions, respectively. Via the plug-in structure portions, the side plates and the reinforcement plate can be formed into an integral unit upon fabrication of the center frame. Preferably, the plug-in structure portions may comprise holes formed through the side plates and lugs formed on the reinforcement plate such that the lugs can be inserted into the holes, respectively. By inserting the lugs, which are formed on the reinforcement plate, into the holes formed through the side plates upon fabrication of the center frame, walls of the side plates and side edge portions of the reinforcement plate can be brought into close contact with each other to form a firmly-integrated unit.

It is also preferred to arrange the side plates facing each other and in a pair on opposite side edge portions of the reinforcement plate, respectively, to form the holes through the side plates, and to form the lugs, which are to be inserted into the holes, on the opposite side edge portions of the reinforcement plate, respectively. By inserting the lugs, which are formed on the opposite side edges of the reinforcement plate, into the corresponding holes formed through the paired side plates upon fabrication of the center frame, the paired side plates and the reinforcement plate, which is arranged between these side plates, can be brought into close contact with each other to form a firmly-integrated unit.

Preferably, the side plates can each be provided with a lifting hole for enabling to lift the construction machinery, a hole for a boom foot pin and a hole for a boom cylinder pin, and the holes in each of the side plates can each be formed at a position below a line connecting a center of the corresponding hole for the boom foot pin with a center of the corresponding lift hole but above a line connecting a center of the corresponding hole for the boom cylinder pin and the center of the corresponding lift hole. When the holes in each side plate are positioned in a region below the line connecting the center of the corresponding hole for the boom foot pin and the center of the corresponding lift hole and above the line connecting the center of the corresponding hole for the boom cylinder pin and the center of the corresponding lift hole, the side plates and the reinforcement plate can be formed into a firmly-integrated unit while minimizing a reduction in the strength of the side plates. As a consequence, the center frame is assured to have stable structural strength.

To achieve the above-described first object, the present invention provides in a second aspect thereof a swing frame structure for construction machinery, said swing frame structure being to be arranged in a swing upperstructure and having a center frame composed of side plates and a bottom plate joined each other, wherein the swing frame structure is provided with mating portions for bringing the side plates and the bottom plate into engagement with each other such that the side plates and the bottom plate are positioned relative to each other. When constructed as described above, upon fabrication of the center frame, the side plates of the center frame are positioned on the bottom plate via the mating portions. The side plates and the bottom plate can be welded together without needing any jig for fixing the side plates and the bottom plate with each other. Compared with the conventional art, the cost required for jigs can be reduced, no consideration is needed as to the handling of such a jig or its storage space, and the maintenance and management cost for jigs required for the overall fabrication of the center frame can be reduced.

In the swing frame structure, the mating portions may comprise, for example, plug-in structure portions, respectively. Via the plug-in structure portions, the positioning can be performed upon fabrication of the center frame. The plug-in structure portions may desirably be positioned on a side outer than a swing-wheel-mounting surface. This construction makes it possible to avoid penetration of rain water or the like into a grease bath inside the swing wheel via the plug-in structure portions, thereby making a contribution to the realization of a stable construction of construction machinery. Preferably, the plug-in structure portions may comprise holes formed through the bottom plate and lugs formed on the side walls such that the lugs can be inserted into the holes, respectively. When constructed as described above, the lower end faces of the side plates can be brought into close contact with the upper wall of the bottom plate by inserting the lugs, which are formed in the side plates, into the holes, which are formed through the bottom plate, upon fabrication of the center frame.

Preferably, the side plates can be arranged in a pair and opposite the bottom plate, the lugs can be formed on the side plates, respectively, and the holes in which the lugs are to be inserted can be formed through the bottom plate. When constructed as described above, the bottom plate and the paired side plates can be brought into close contact with each other by inserting the lugs, which are formed in the side plates, into their corresponding holes, which are formed through the bottom plate, upon fabrication of the center frame.

To achieve the second object, the present invention also provides in a third aspect thereof a swing frame structure for construction machinery, said swing frame structure being to be arranged in a swing upperstructure and being composed of a tail frame including frame members with upper flanges and a center frame including side plates, said upper flanges of the frame member and the side plates having been joined each other by welding, wherein the upper flanges of frame members are provided with openings formed at front end portions thereof, and the side plates are inserted in the openings, respectively. When constructed as described above, upon welding and joining the upper flanges of the frame members, which are included in the tail frame, with the side plates included in the center frame, the side plates of the center plates are inserted into the openings formed in the front end portions of the upper flanges of the corresponding frame members, and in this state, the front end portions of the upper flanges and the corresponding side plates of the center frame can be welded together. Accordingly, relative movements between the upper flanges of the frame members and the corresponding side plates of the center frame can be limited by the openings and, when welded in this state, desired joint strength can be assured without needing any grinder finishing. As a result, the manhour can be reduced compared with the prior art, and the fabrication cost for the swing frame can also be reduced compared with the prior art. As no clad welding is required upon welding the front end portions of the upper flanges with the side plates of the center frame, automatic welding is feasible. Accordingly, the manhour can be reduced further provided that the upper flanges and the side plates are welded together by such automatic welding.

Preferably, the side plates can be provided with stepped portions at portions thereof which are facing the openings of the upper flanges, respectively, and a height dimension of an upper step face and a lower step face, between which the stepped portion of each side plate is defined, can be set greater than a thickness dimension of the corresponding one of the upper flanges. Owing to this construction, when the side plates of the center frame are inserted into the openings formed in the front end portions of the corresponding upper flanges, the upper step faces of the stepped portions formed on the side plates of the center frame can be designed to extend beyond the upper faces of the corresponding upper flanges. The use of the extending portions, therefore, makes it possible to weld the upper flanges and the corresponding side plates of the center frame with each other.

Preferably, weld portions may be formed between the stepped portions of the side plates and walls of the openings of the corresponding upper flanges, between the upper faces of the upper flanges and side walls of the corresponding side plates, between front end faces of the upper flanges and the side walls of the corresponding side plates, and between lower faces of the upper flanges and the side walls of the corresponding side plates, respectively. In a state that the side plates of the center frame are inserted in the openings of the front end portions of the corresponding upper flanges, it is, therefore, possible to continuously perform, for example, the welding work between the stepped portions of the side plates and the walls of the corresponding openings, the welding work between the upper faces of the upper flanges and the side walls of the corresponding side plates, the welding work between the front end faces of the upper flanges and the side walls of the corresponding side plates, and the welding work between the lower faces of the upper flanges and the side walls of the corresponding side walls. By performing these welding work, high joint strength can be assured.

Preferably, the openings can each be formed in a turned, square U shape as viewed in plan. When the side plates of the center frame are inserted in the openings in the front end portions of the corresponding upper flanges, the side plates can be brought into close contact with the inner walls of the corresponding openings, thereby making it possible to increase the positioning accuracy between the upper flanges and the corresponding side plates of the center frame.

Further, the front end portion formed in the front end portion of each of the upper flanges may preferably be formed in a tapered shape as viewed in plan. When the front end portions of the upper flanges are formed into tapered shapes as viewed in plan as described above, it is possible to reduce the concentration of a stress at the welded joint portions between the front end portions of the upper flanges and the corresponding side plates of the center frame.

To achieve the third object, the present invention also provides in a fourth aspect thereof a swing frame structure for construction machinery, said swing frame structure being to be arranged in a swing upperstructure and having a tail frame composed of engine brackets and side plates of frame members joined each other, wherein the swing frame structure is provided with mating portions for bringing the engine brackets and the side plates of the frame members into engagement with each other such that the engine brackets and the side plates of the frame members are positioned relative to each other. When constructed as described above, upon fabrication of the tail frame, the engine brackets and the side plates of the frame members can be positioned via the mating portions. Arrangement of the engine brackets and the frame members, which have been positioned as described above, on a bottom plate which constitutes the tail frame makes it possible to stably mount the integral unit, which includes these engine brackets and frame members, on the bottom plate. No special jig is, therefore, needed to hold the engine brackets and the frame members. As a consequence, the cost required for jigs can be reduced compared with the conventional art, and the fabrication cost for the tail frame can be reduced. Moreover, no consideration is needed as to the handling or storage space of such a jig.

In the swing frame structure, the mating portions may comprise, for example, plug-in structure portions, respectively. When constructed so, the engine brackets and the frame members can be positioned via the plug-in structure portions upon fabrication of the tail frame. Preferably, the plug-in structure portions may comprise holes formed through the side plates of the frame members and lugs formed on the engine brackets such that the lugs can be inserted into the holes, respectively. By inserting the lugs, which are formed on the engine brackets, into the holes formed through the side plates of the frame members upon fabrication of the tail frame, walls of the side plates of the frame members and end portions of the engine brackets can be brought into close contact with each other.

Preferably, the frame members can be arranged in a pair and facing opposite end portions of the engine brackets, respectively, the holes can be formed through the side plates of the frame members, and the lugs to be inserted into the holes can be formed on the opposite end portions of the engine brackets, respectively. By inserting the lugs, which are formed on the opposite end portions of the engine brackets, into the corresponding holes formed through the side plates of the paired frame members upon fabrication of the tail frame, the side plates of the paired frame members and the engine brackets arranged between these side plates can be brought into close contact with each other.

When the frame members comprise I-beams or the holes are positioned on neutral axes of the side plates of the frame members, a firmly-integrated unit including the engine brackets and the side plates of the frame members can be obtained while minimizing a reduction in the strength of the side plates of the frame members.

BEST MODES FOR CARRYING OUT THE INVENTION

One embodiment of the swing frame structure according to the present invention for construction machinery will hereinafter be described based on the drawings.

Figure 1:
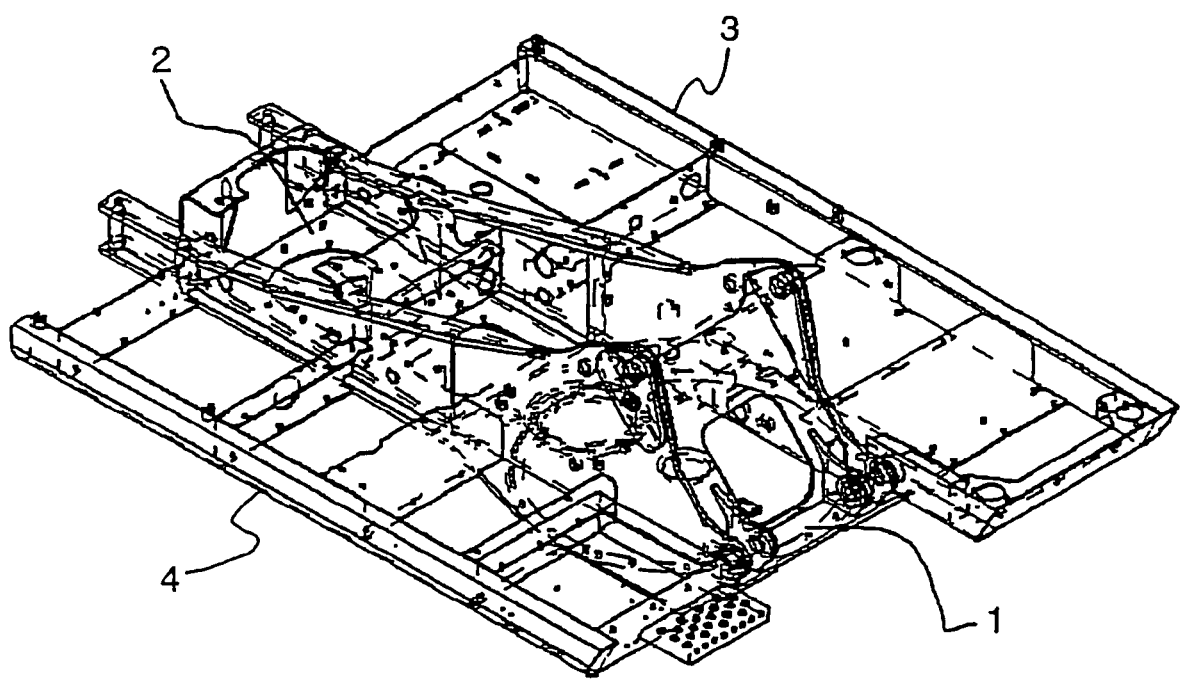
FIG. 1 is a perspective view showing the overall construction of one embodiment of a swing frame structure according to the present invention for construction machinery.

FIG. 1 is a perspective view showing the overall construction of the one embodiment of the present invention.

This embodiment is arranged on construction machinery, for example, a hydraulic excavator, and as shown in FIG. 1, is provided at a front position thereof with a center frame 1 and at a rear position thereof with a tail frame 2, and is also provided at side positions thereof with side frames 3,4.

Joint structures between side plates and reinforcement plate in the center frame.

Figure 2:
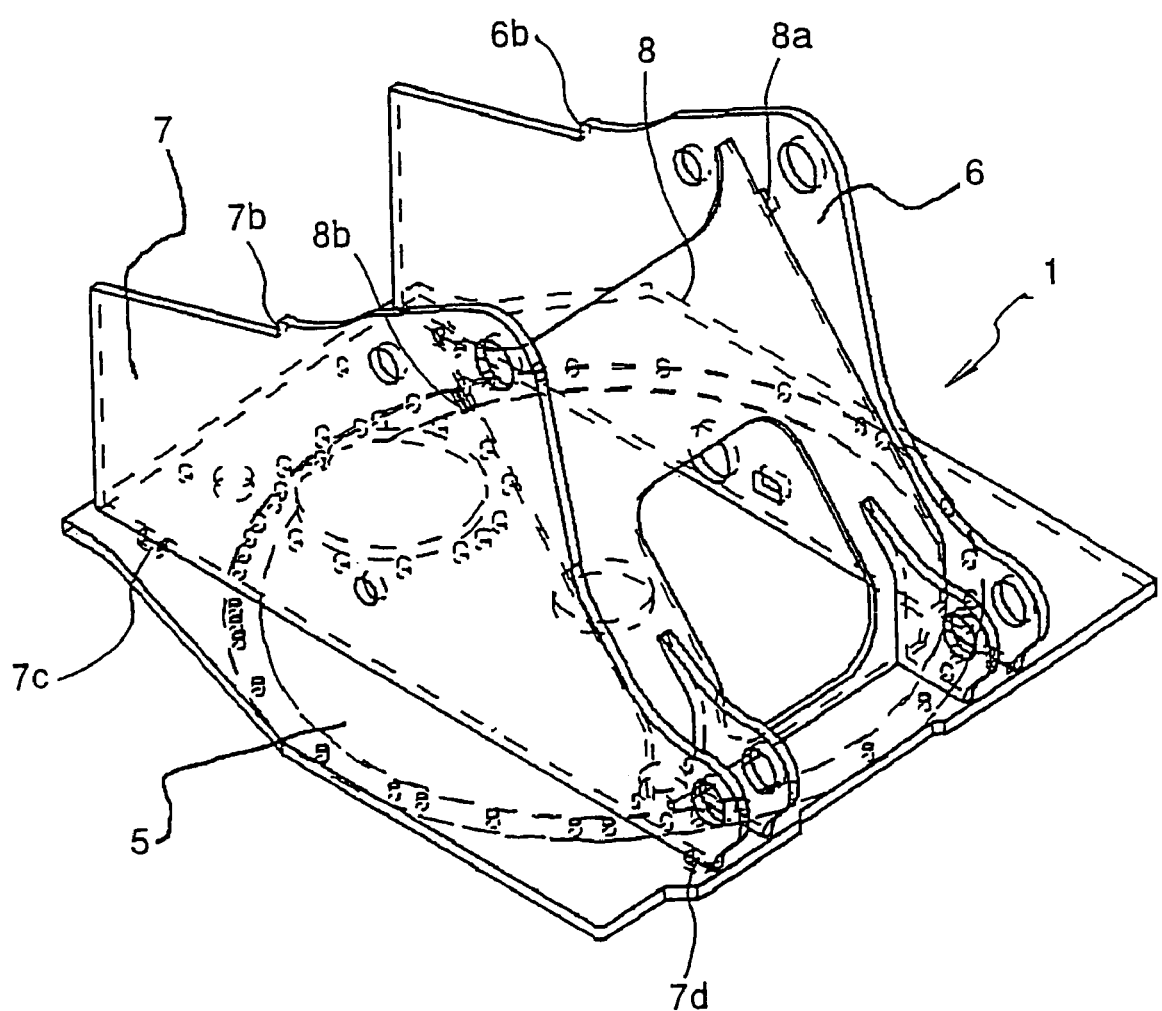
FIG. 2 is an enlarged perspective view illustrating a center frame arranged in the embodiment shown in FIG. 1.
Figure 3:
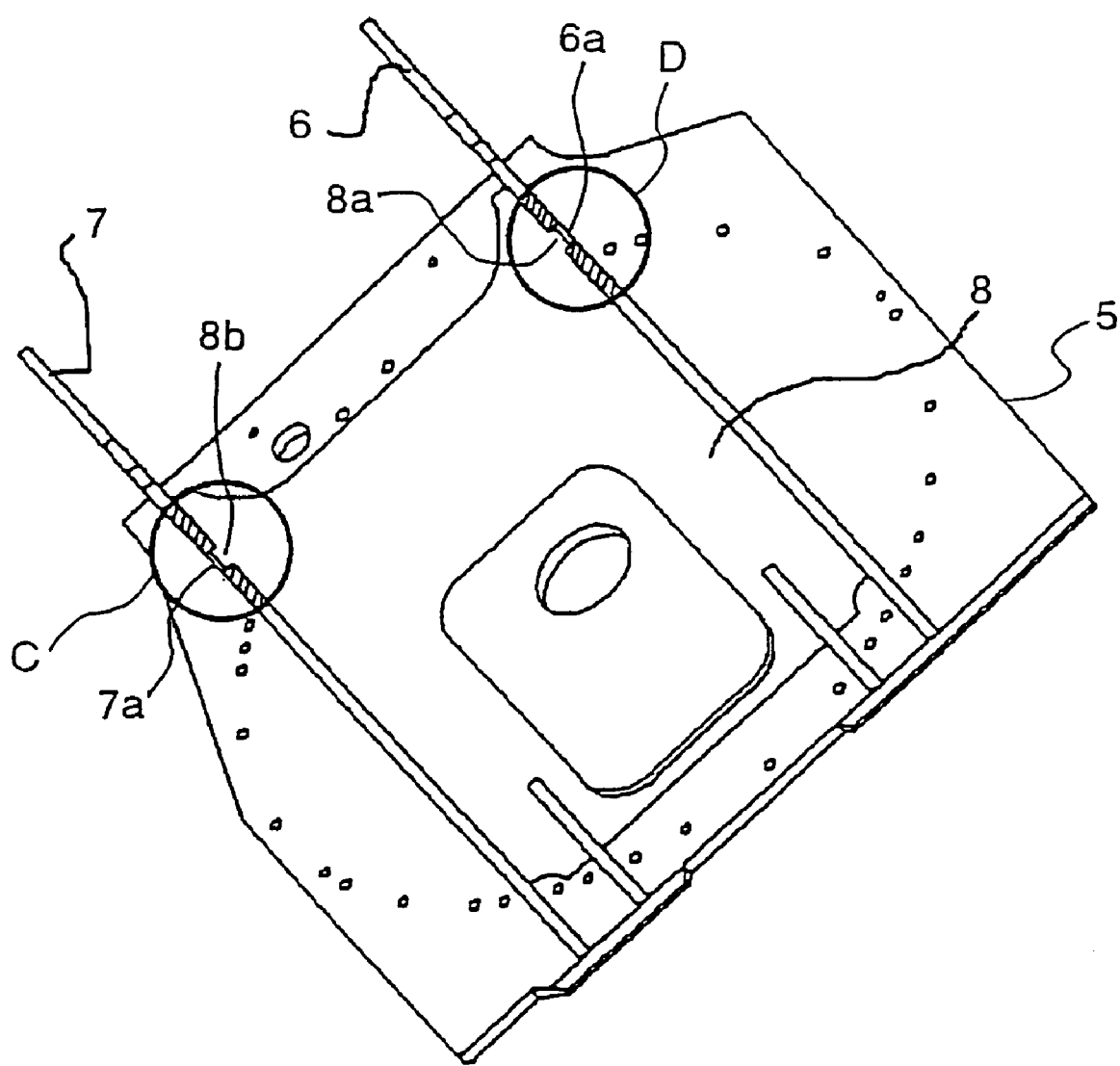
FIG. 3 is a plan view of a center frame illustrated in FIG. 2.
Figure 4:
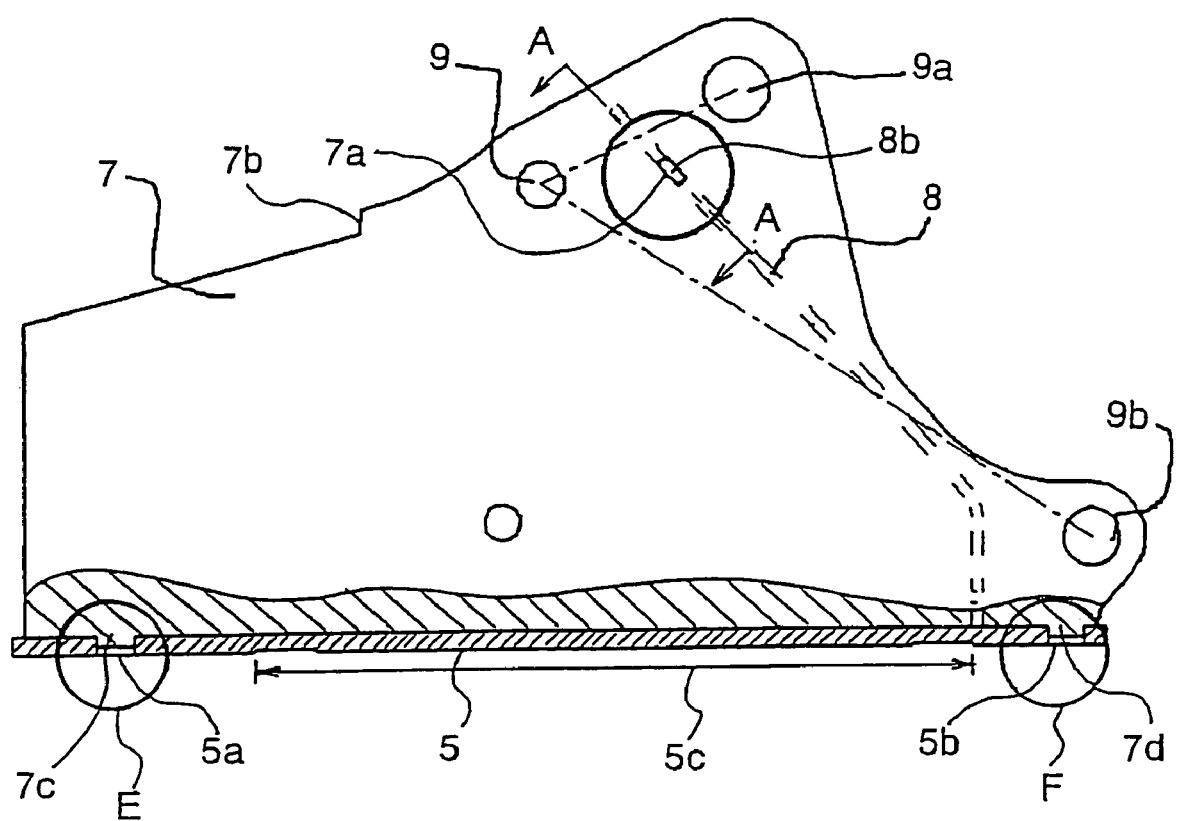
FIG. 4 is a partially cut-away, fragmentary, side view of the center frame illustrated in FIG. 2.
Figure 5:
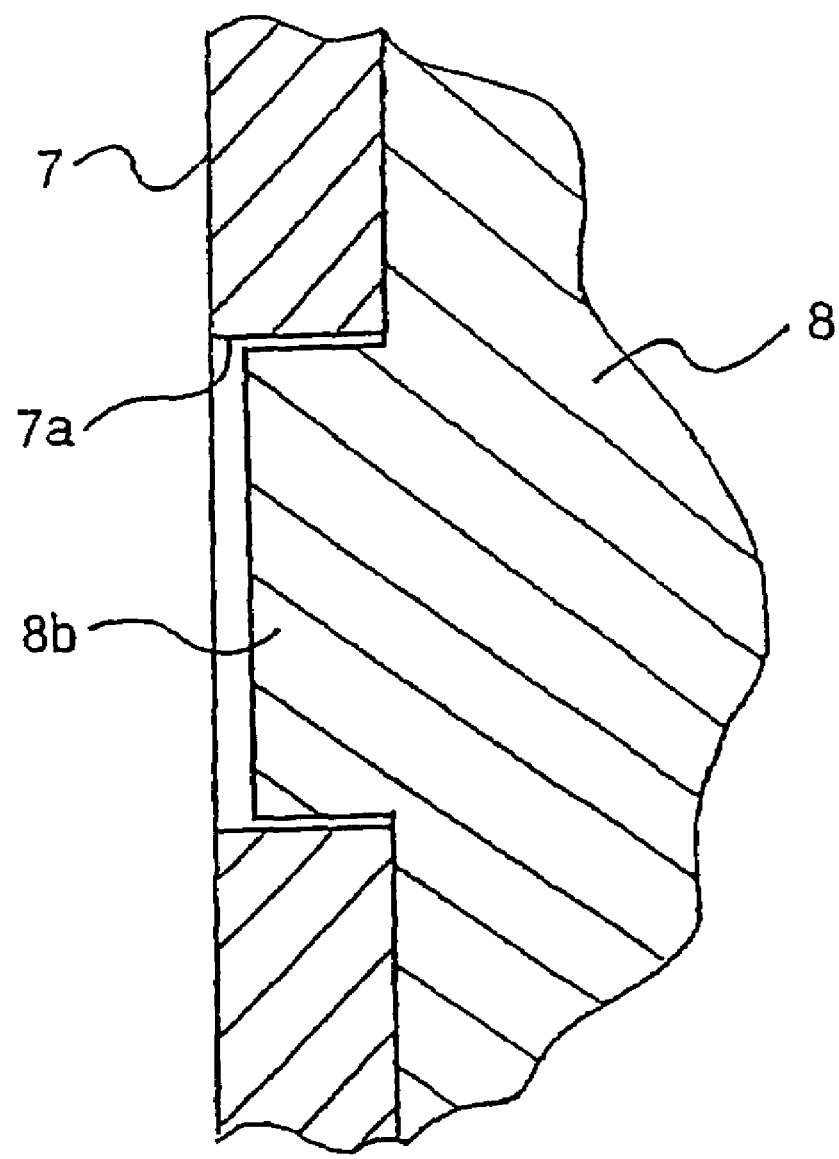
FIG. 5 is an enlarged, cross-sectional view taken along A-A of FIG. 4.
Figure 6:
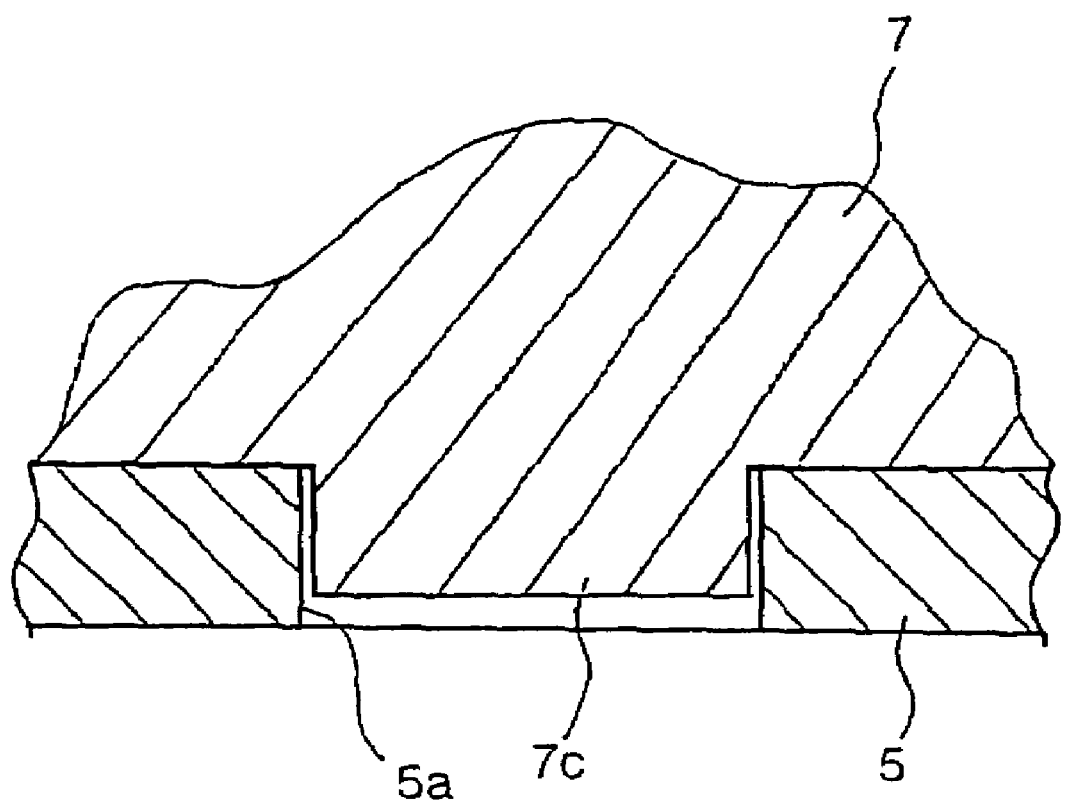
FIG. 6 is an enlarged view of a part E of FIG. 4.

FIG. 2 is an enlarged perspective view illustrating the center frame arranged in this embodiment shown in FIG. 1, FIG. 3 is a plan view of the center frame illustrated in FIG. 2, FIG. 4 is a partially cut-away, fragmentary, side view of the center frame illustrated in FIG. 2, FIG. 5 is an enlarged, cross-sectional view taken along A-A of FIG. 4, and FIG. 6 is an enlarged view of a part E of FIG. 4.

The center frame 1 includes a pair of side plates 6,7 and a reinforcement plate 8 arranged between these side plates 6 and 7. This embodiment is provided with mating portions, which bring the side plates 6,7 and the reinforcement plate 8 into engagement with each other, and position them. These mating portions comprise, for example, plug-in structure portions.

As illustrated in FIGS. 3, 4 and 5, the plug-in structure portions which constitute the mating portions comprise, for example, holes 6a,7a formed through the paired side plates 6,7 and lugs 8a,8b formed on opposite side edge portions of the reinforcement plate 8 and to be inserted into the holes 6a,7a.

Through each of the side plates 6,7, there are formed, as shown in FIG. 4, a lifting hole 9, a hole 9a for a boom foot pin, and a hole 9b for a boom cylinder pin. The lifting hole 9 enables to lift the hydraulic excavator. Into the hole 9a, a pin which connects a base portion of an unillustrated boom to the center frame 1 is inserted. Into the hole 9b, on the other hand, a pin which connects an unillustrated boom cylinder for driving a boom to the center frame 1 is inserted.

As illustrated by way of example in FIG. 4, the above-mentioned holes 6a,7a formed through the side plates 6,7, respectively, are formed at a position below a line connecting a center of the corresponding hole 9a for the boom foot pin with a center of the corresponding lift hole 9 but above a line connecting a center of the corresponding hole 9b for the boom cylinder pin and the center of the corresponding lift hole 9.

Joint structures between the side plates and a bottom plate in the center frame

This embodiment is also provided with mating portions, which bring the paired side plates 6 and a bottom plate 5, all of which are included in the center frame 1, into engagement with each other, and position them. For example, these mating portions can also comprise plug-in structure portions.

As shown by way of example in FIGS. 4, 6 and so on, the plug-in structure portions which constitute these mating portions are composed of holes 5a,5b formed corresponding to the side plate 7 in a pair through the bottom plate 5 and holes formed corresponding to the side plate 6 in a pair through the bottom plate 5, namely, four holes in total, lugs 7c,7d formed on the side plate 7 and to be inserted into the corresponding holes 5a,5b of the bottom plate 5, and two lugs formed on the side plate 6 and to be inserted into the corresponding ones of the remaining holes of the bottom plate 5.

It is to be noted that the above-mentioned lugs 7c,7d and the like formed through the side plates 7,6 are set in equal shape and dimensions with each other as shown by way of example at the parts E and F in FIG. 4. Corresponding to this, the holes such as the holes 5a, 5b and so on formed as many as four in total through the bottom plate 5 are also set in equal shape and dimensions.

Further, the above-mentioned plug-in structure portions are positioned on a side outer than a swing-wheel-mounting surface 5c as shown in FIG. 4.

Figure 7:
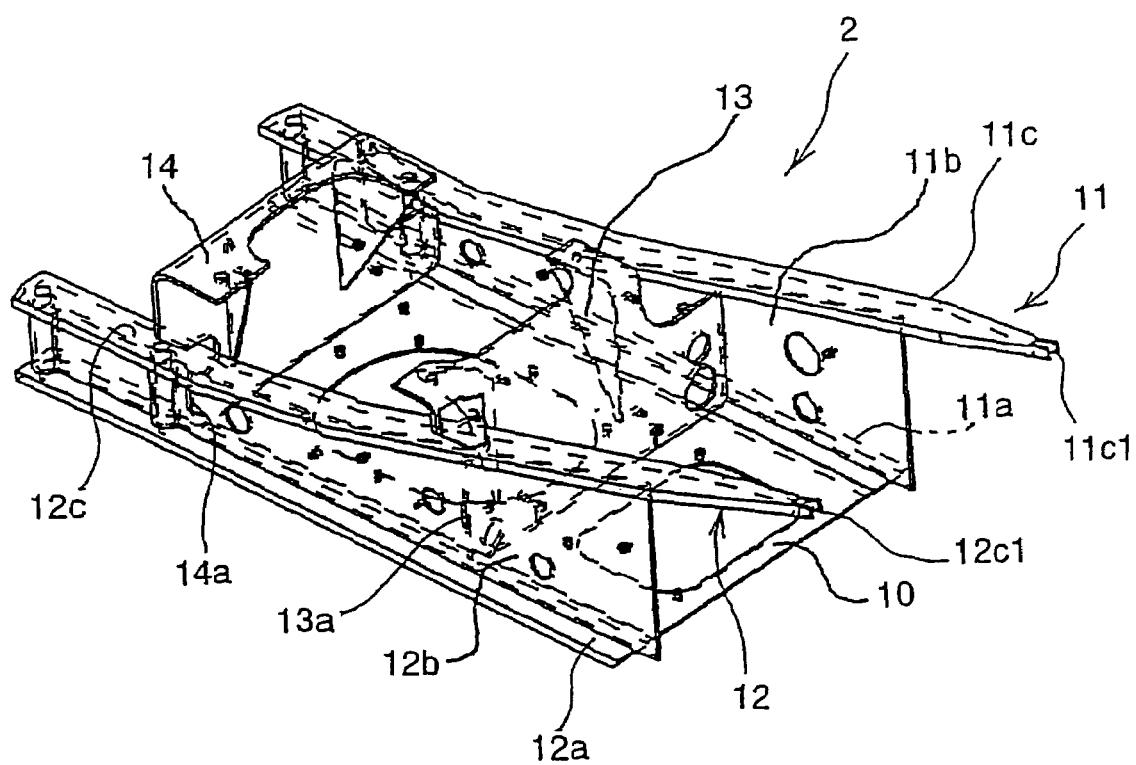
FIG. 7 is a perspective view depicting a tail frame arranged in the embodiment shown in FIG. 1.
Figure 8:
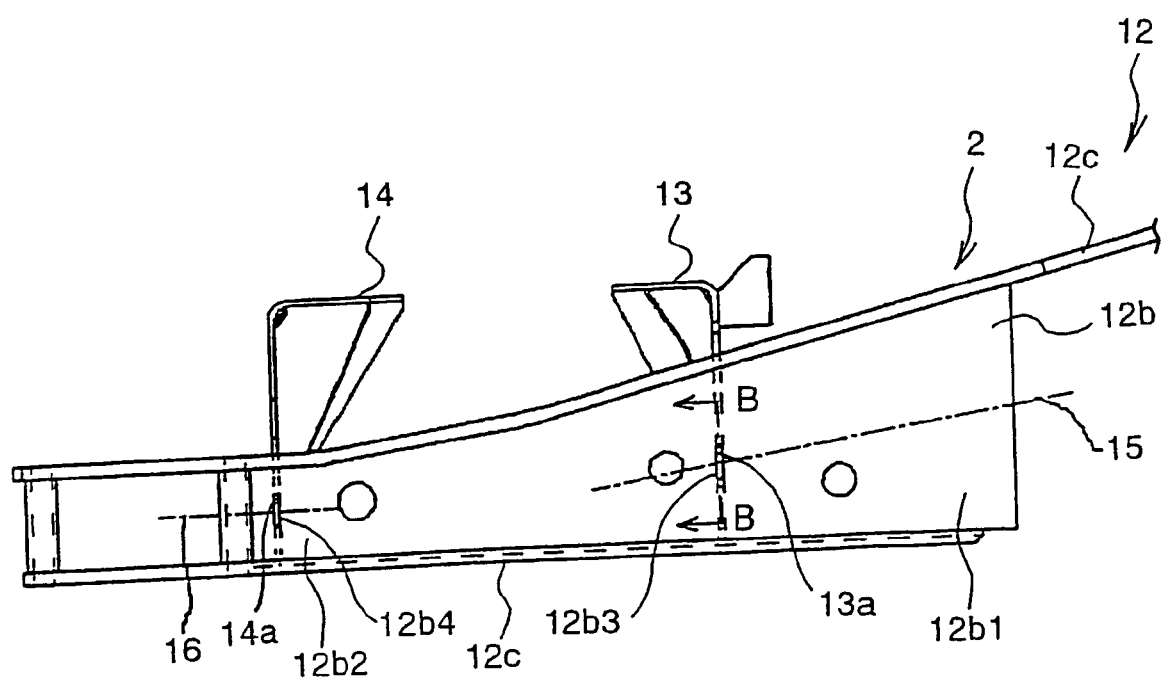
FIG. 8 is an enlarged side view of the tail frame depicted in FIG. 7.
Figure 9:
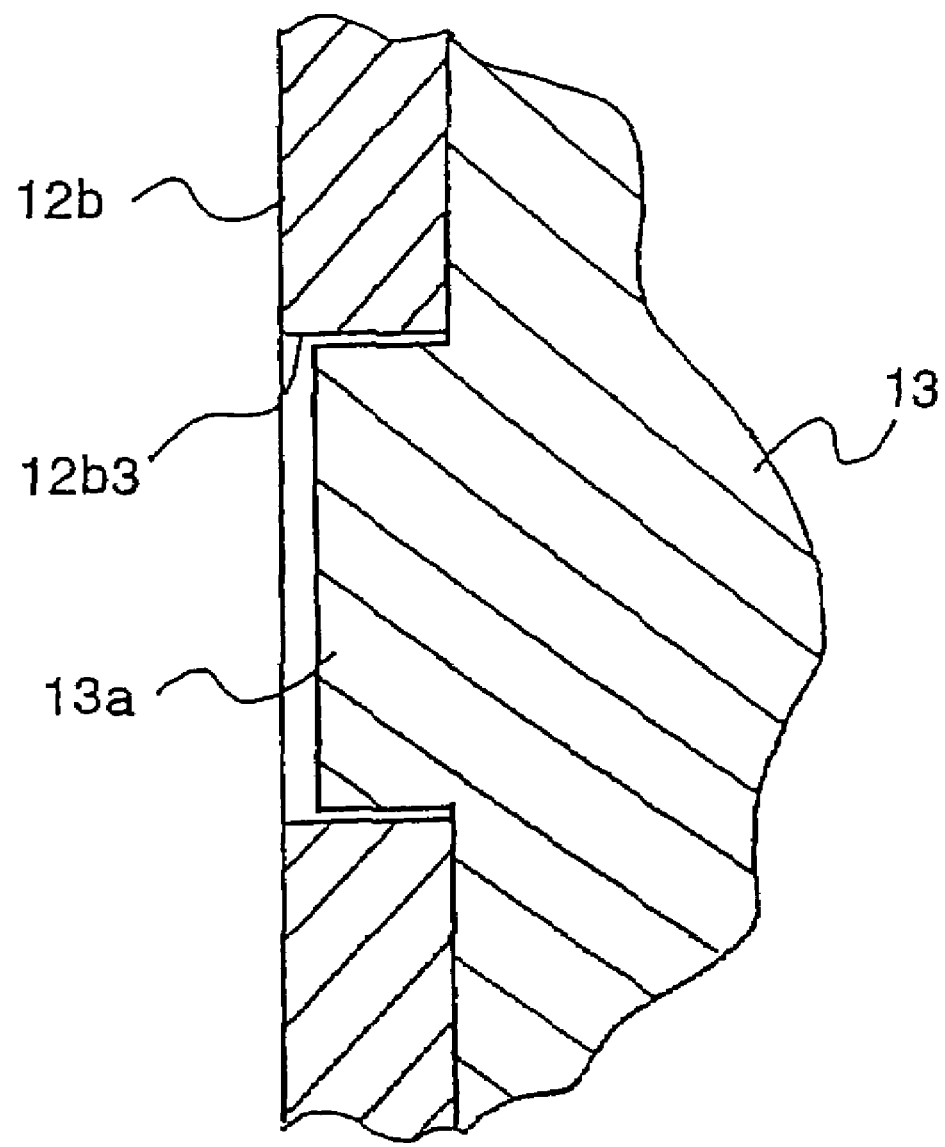
FIG. 9 is an enlarged, cross-sectional view taken along B-B of FIG. 8.

Joint structures between the engine brackets and the side plates of the frame members FIG. 7 is a perspective view depicting a tail frame arranged in the embodiment shown in FIG. 1, FIG. 8 is an enlarged side view of the tail frame depicted in FIG. 7, and FIG. 9 is a cross-sectional view taken along B-B of FIG. 8.

This embodiment is also provided with mating portions, which bring engine brackets 13,14 and a pair of frame members, that is, side plates 11b, 12b of I-beams 11,12 into engagement with each other, and position them. The engine brackets 13,14 and the side plates 11b,12b are included in . . . the tail frame 2. These mating portions may also comprise, for example, plug-in structure portions.

As shown by way of example in FIGS. 8, 9 and so on, the plug-in structure portions which constitute these mating portions are composed of a hole 12b3 formed through a front section 12b1 of the side plate 12b of the I-beam 12, a hole 12b4 formed through a rear section 12b2 of the side plate 12b of the I-beam 12, a hole formed through a front section of the side plate 11b of the I-beam 11, and a hole formed through a rear section of the side plate 11 of the I-beam 11, namely, four holes in total; and a lug 13a and a lug formed on opposite end portions of the engine bracket 13, respectively, said lug 13a being to be inserted into the hole 12b3 of the side plate 12b and said lug being to be inserted into the hole formed through the front section of the side plate 11b, and a lug 14a and a lug formed on opposite end portions of the engine bracket 14, respectively, said lug 14a being to be inserted into the hole 12b4 of the side plate 12b and said lug being to be inserted into the hole formed through the rear section of the side plate 11b, that is, four lugs in total.

The hole 12b3 formed through the side plate 12b of the I-beam 12 is positioned on a neutral axis 15 of the front section 12b1 of the side plate 12b, while the hole 12b4 formed through the side plate 12b is positioned on a neutral axis 16 of the rear section 12b2 of the side plate 12b. Similarly, the hole formed through the front section of the side plate 11b of the I-beam 11 is positioned on a neutral axis of the front section of the side plate 11b, while the hole formed through the rear section of the side plate 11b is positioned on a neutral axis of the rear section of the side plate 11b.

It is to be noted that as illustrated in FIG. 7, the I-beam 11 is integrally provided on a lower part of the side plate 11b with a lower flange 11a and on an upper part of the side plate 11b with an upper flange 11c. Similarly, the I-beam 12 is also integrally provided on a lower part of the side plate 12b with a lower flange 12a and on an upper part of the side plate 12b with an upper flange 12c.

Figure 10A:
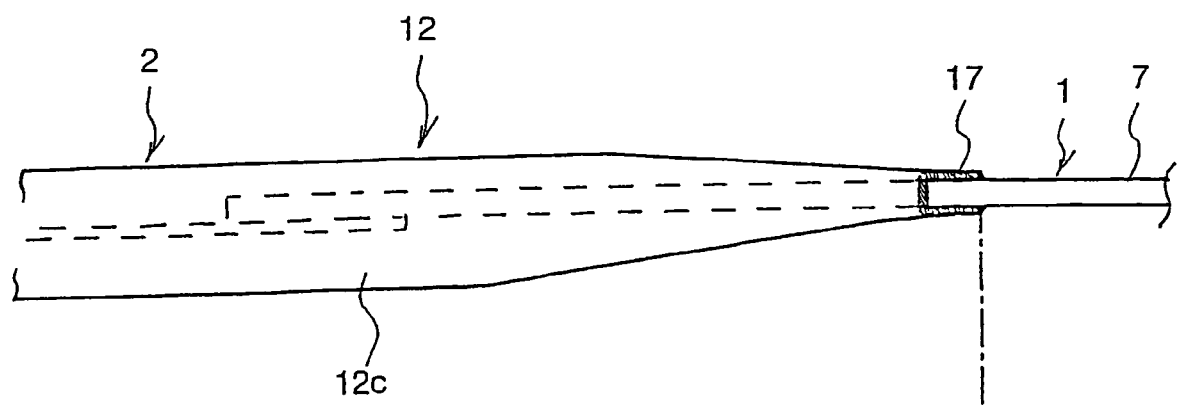
FIG. 10 is a view showing a joint structure between an upper flange of an I-beam, which constitutes the tail frame depicted in FIG. 7, and a side plate which constitutes the center frame.
Figure 10B:
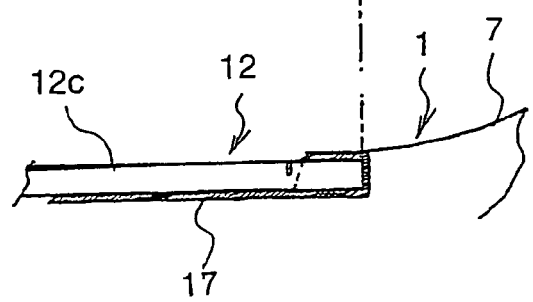

Joint structure between the upper flanges of the I-beams and the side plates of the center frame FIG. 10 is a view showing a joint structure between an upper flange of an I-beam, which constitutes the tail frame depicted in FIG. 7, and a side plate which constitutes the center frame, in which FIG. 10(a) is a fragmentary plan view and FIG. 10(b) is a fragmentary side view. FIG. 11 diagrammatically shows the state of the upper flange of the I-beam and the side plate upon their assembly, both of which are shown in FIG. 10, in which FIG. 11(a) is a fragmentary plan view and FIG. 11(b) is a fragmentary side view.

Figure 11A:
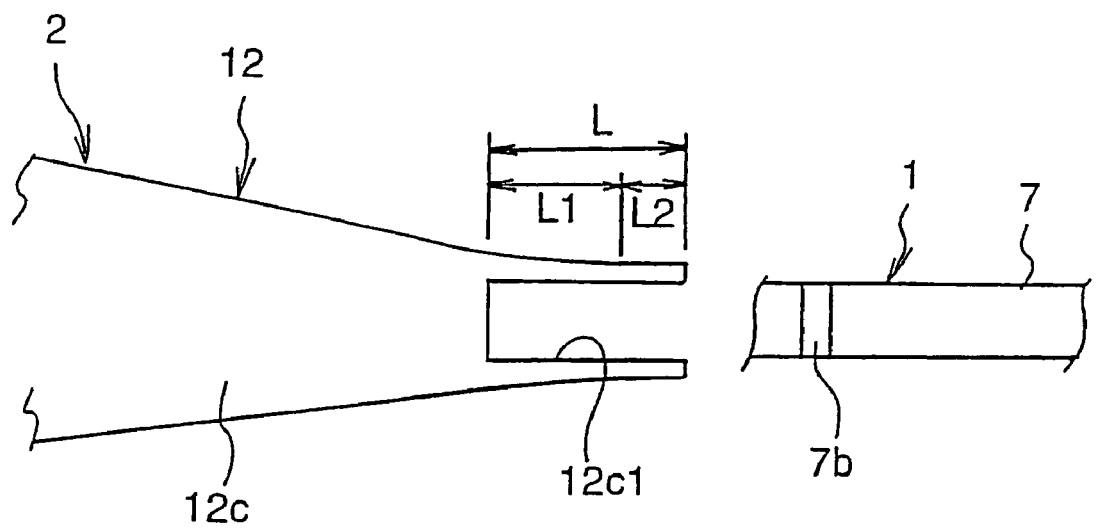
FIG. 11 diagrammatically shows the state of an upper flange of the I-beam and the side plate upon their assembly, both of which are shown in FIG. 10.
Figure 11B:
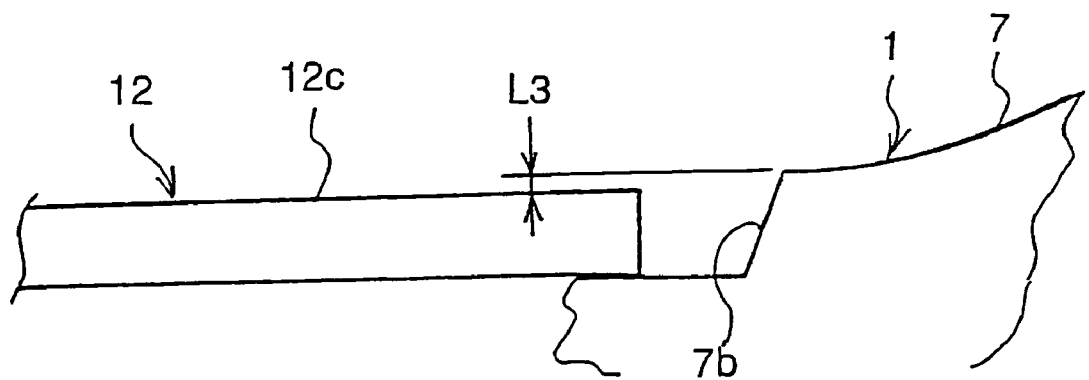
Figure 12:
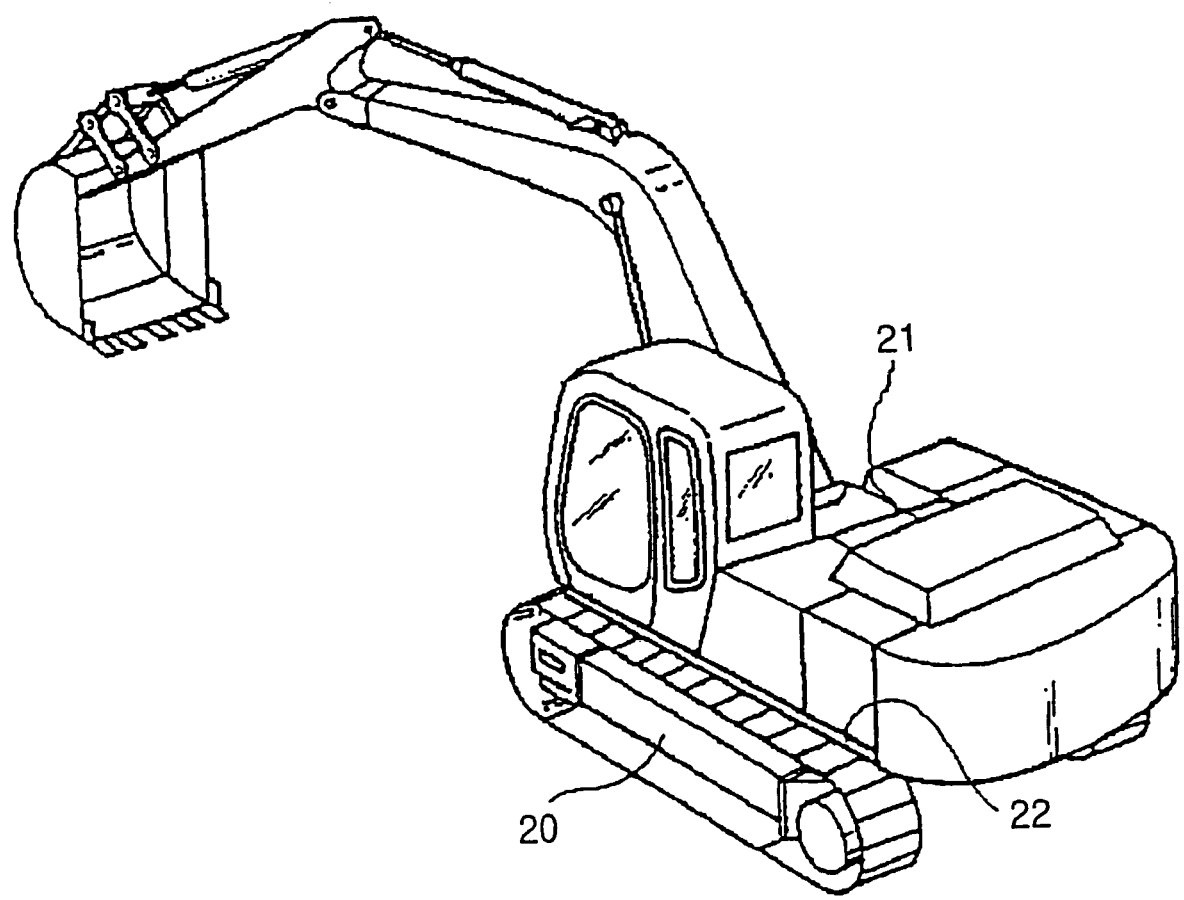
FIG. 12 is a perspective view illustrating a hydraulic excavator shown as an example of construction machinery.
Figure 13:
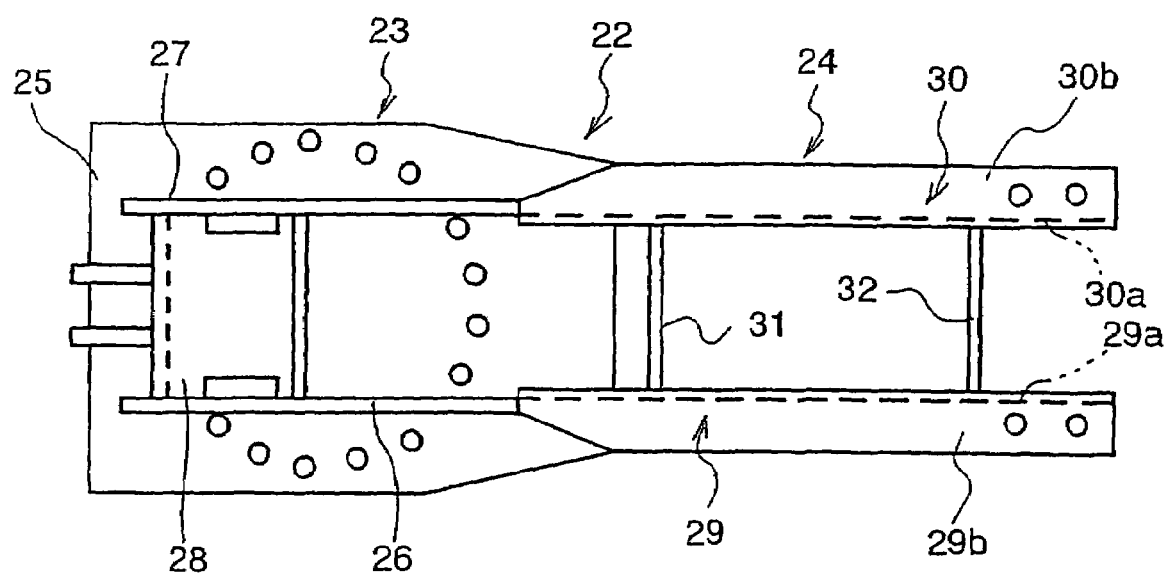
FIG. 13 is a perspective view illustrating one example of conventional swing frame structures.
Figure 14:
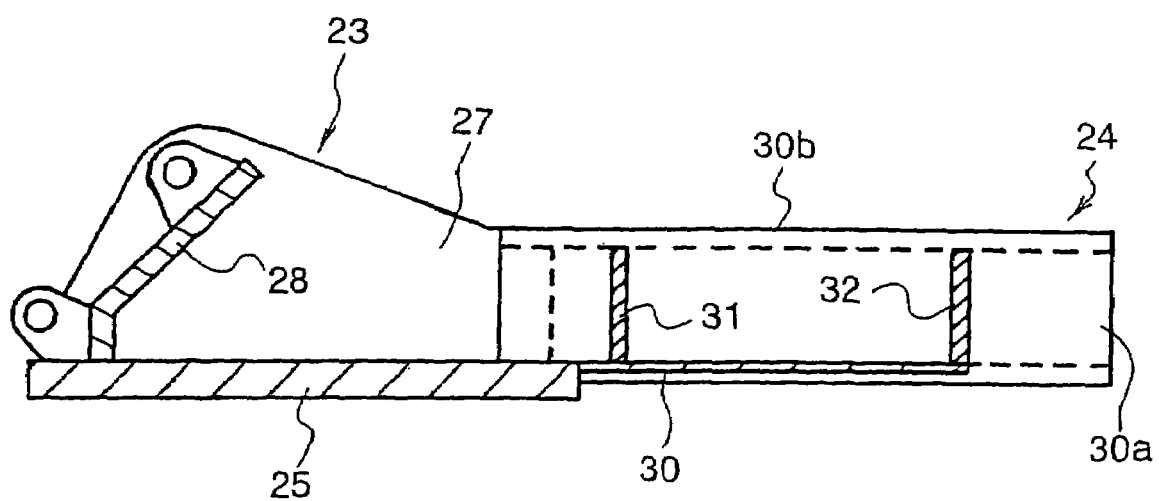
FIG. 14 is a side view of the swing frame structure illustrated in FIG. 13.
Figure 15A:
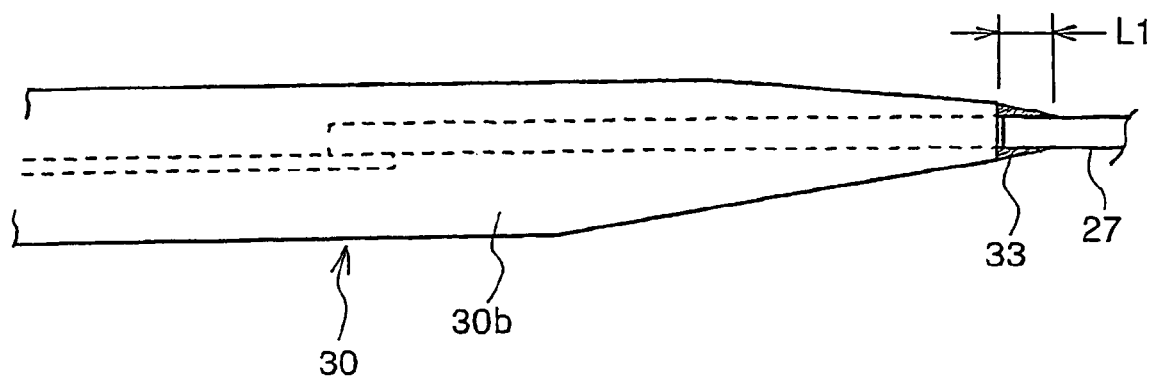
FIG. 15 is a view showing a joint structure between an upper flange of an I-beam, that is, a frame member, which constitutes a tail frame arranged in the swing frame structure illustrated in FIG. 13, and a side plate which constitutes a center frame.
Figure 15B:
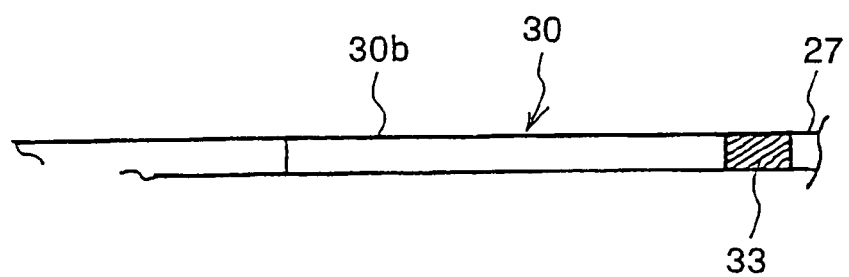

As shown in FIG. 11(a), the upper flange 12c of the I-beam 12 and the corresponding side plate 7 of the center frame 1 are constructed, for example, such that an opening 12c1 of a turned, square U shape as viewed in plan is formed in a front end portion of the upper flange 12c of the I-beam 12 and the side plate 7 of the center frame 1 is inserted into the opening 12c1. As depicted in FIG. 11(b), a stepped portion 7b is formed on the side plate 7 of the center frame 1, and the dimension of the height from a lower stage face to an upper stage face, between which the stepped portion 7b is defined, is set greater by L3 than the thickness dimension of the upper flange 12c of the I-beam 12.

As shown in FIG. 7, the upper flange 11c of the I-beam 11 and the corresponding side plate 6 of the center frame 1 are similarly constructed such that that an opening 11c1 of a turned, square U shape as viewed in plan is formed in a front end portion of the upper flange 11c of the I-beam 11 and the side plate 6 of the center frame 1 is inserted into the opening 11c1. As depicted in FIG. 2, a stepped portion 6b is formed on the side plate 6 of the center frame 1, and the dimension of the height from a lower stage face to an upper stage face, between which the stepped portion 6b is defined, is set greater by L3 than the thickness dimension of the upper flange 11c of the I-beam 11 as shown in FIG. 11(b).

As also illustrated in FIG. 11(a), the front end portion of the upper flange 12c of the I-beam 12, where the opening 12c1 is formed, is formed into a tapered shape as viewed in plan. Supposing that the dimension of the opening 12c1 is L, the front end portion of the upper flange 12c of the I-beam 12 is formed, for example, such that the range of a dimension L2 from the front end portion of the upper flange 12 is set at the same width dimension and the range of a dimension L1 extending from the dimension L2 is set to have a width dimension gradually increasing with the distance from the front end portion. The upper flange 11c of the I-beam 11 is set likewise.

After the side plate 7 of the center frame 1 is inserted into the opening 12c1 of the upper flange 12c of the I-beam 12 in the state shown in FIGS. 11(a) and 11(b), the upper flange 12c an the side plate 7 are welded and joined together as depicted in FIGS. 10(a) and 10(b). Described specifically, weld portions 17 are formed between the stepped portion 7b of the side plate 7 and the wall of the opening 12c1 of the upper flange 12c, between the upper face of the upper flange 12c and the side wall of the side plate 7, between the front end face of the upper flange 12c and the side wall of the side plate 7, and between the lower face of the upper flange 12c and the side wall of the side plate 7, respectively.

The welding and joining of between the I-beam 11 shown in FIG. 7 and the side plate 6 of the center frame 1 illustrated in FIG. 2 is conducted in a similar manner as mentioned above.

A description will hereinafter be made about advantageous effects of the respective joint structures constructed as described above.

Advantageous effects of the joint structures between the side plates and the reinforcement plate in the center frame According to this embodiment, upon fabrication of the center frame 1, the lugs 8a,8b formed on the reinforcement plate 8 are inserted into the corresponding holes 6a,7a formed in the paired side plates 6,7, such that the paired side plates 6,7 and the reinforcement plate 8 arranged between these side plates 6 and 7 can be brought into close contact with each other and can be positioned. For example, by holding the side plates 6,7 and the reinforcement plate 8 in this state with a desired jig, a firmly-integrated unit can be formed. Accordingly, the arrangement of the side plates 6,7 and reinforcement 8, which has been formed into such a firmly-integrated unit, on the bottom plate 5 makes it possible to stably mount and position the integral unit of these side plates 6,7 and reinforcement plate 8 on the bottom plate 5.

In other words, no large jig is required for holding the side plates 6,7 and the bottom plate 5 before starting welding upon fabrication of the center frame 1. The cost for this jig can, therefore, be omitted. Further, no consideration is required as to the handling or storage space of a jig for holding the side plates 6,7 and the bottom plate 5. The maintenance and management cost for jigs required for the overall fabrication of the center frame 1 can be reduced.

As the holes 7*a* in each side plate 7, said holes 7*a* constituting mating portions, are positioned in a region below the line connecting the center of the corresponding hole 9*a* for the boom foot pin and the center of the corresponding lift hole 9 and above the line connecting the center of the corresponding hole 9*b* for the boom cylinder pin and the center of the corresponding lift hole 9, a reduction in the strength of the side plate 7 can be minimized. With respect to the side plate 6, a reduction in strength can be also minimized. Owing to these positioning, stable structural strength can be assured for the center frame 1.

After the side plates 6,7 and the reinforcement plate 8 are positioned on the bottom plate 5 in a state held by the desired jig as mentioned above, the side plates 6,7 and the reinforcement plate 8 and the side plates 6,7 and the bottom plate 5 are subjected to tack welding. Subsequently, final positioning, adjustments and the like among the side plates 6,7, the reinforcement plate 8 and the bottom plate 5 are performed, followed by final welding to complete the center frame.

Advantageous effects of the joint structures between the side plates and the bottom plate in the center frame According to this embodiment, upon fabrication of the center frame 1, the paired side plate 6,7 and the bottom plate 8 can be brought into close contact with each other by inserting the lugs 7*c*,7*d* and so, which are formed on the side plates 7,6 into the corresponding holes of the holes 5*a*,5*b* integrally formed through the bottom plate 5 corresponding to the side plate 7 and the holes integrally formed through the bottom plate 5 corresponding to the side plate 6 such that the paired side plates 6,7 and the bottom plate 5 can be brought into close contact with each other and can be positioned. Owing to this positioning, these side plates 6,7 and the bottom plate 5 can be welded together without needing any jig for fixing the side plates 6,7 and the bottom plate 5 with each other. The cost required for this jig can be omitted, no consideration is needed as to the handling of a jig for holding the side plates and the bottom plate together or its storage space, and the maintenance and management cost for jigs required for the overall fabrication of the center frame can be reduced.

Further, owing to the positioning of the plug-in structure portions between the side plates 6,7 an the bottom plate 5 on the outer side of the swing-wheel-mounting surface 5*c*, it is possible to prevent any penetration of rain water or the like into the grease bath inside the swing wheel via the plug-in structure portions, thereby making a contribution to the realization of a hydraulic excavator of stable construction Advantageous effects of the joint structures between the engine brackets and the frame members According to this embodiment, upon fabrication of the tail frame 2, the lugs 13*a*, 14*a* and so on formed on the engine brackets 13,14 are inserted into the corresponding holes 12*b*3, 12*b*4 and so on formed through the frame members, specifically the side plates 12*b*,11*b* of the I-beams 12,11 so that the engine brackets 13,14 and the I-beams 11,12 can be positioned in close contact with each other and can be arranged without movements on the bottom plate 10 of the tail frame 2. No jig is, therefore, needed for holding the engine brackets 13,14 and the I-beams 11,12. The cost required for this jig can be omitted, no consideration is needed as to the handling of a jig for positioning and holding the engine brackets 13,14 and the I-beams 11,12 or its storage space, and the fabrication cost for the tail frame 2 can be reduced.

Advantageous effects of the joint structures between the upper flanges of the I-beams and the side plates of the center frame Upon welding and joining the upper flanges 11*c*,12*c* of the I-beams 11,12, which are included in the tail frame 2, with the side plates 6,7 included in the center frame 1 the side plates 7,7 are inserted into the openings 11*c*1,12*c*1 formed in the front end portions of the upper flanges 11*c*,12*c*, and in this state, the front end portions of the upper flanges 11*c*, 12*c* and the corresponding side plates 6,7 are welded together. Accordingly, relative movements between the upper flanges 11*c*,12*c* and the corresponding side plates 6,7 are limited by the openings 11*c*1,12*c*1 and, when welded in this state, desired joint strength can be assured without needing any clad welding and also without needing any grinder finishing. As a result, the manhour can be reduced, and the fabrication cost for the swing frame can also be reduced.

As neither clad welding nor post-welding grinder finishing is required upon welding the upper flanges 11*c*, 12*c* with the side plates 6,7 as mentioned above, automatic welding is feasible as mentioned above. Practice of this automatic welding makes it possible to further reduce the manhour.

Further, the upper step faces of the stepped portions 6*b*,7*b* formed on the side plates 6,7 be designed to extend beyond the upper faces of the corresponding upper flanges 11*c*,12*c* when the side plates 6,7 are inserted into the openings 11*c*1, 12*c*1 of the upper flanges 11*c*,12*c*. The use of the extending portions, therefore, makes it possible to weld the upper flanges 11*c*, 12*c* and the corresponding side plates 6,7 with each other, and hence to assure a stable welded structure.

It is also possible to continuously perform the welding work between the stepped portions 6*b*,7*b* of the side plates 6,7 and the walls of the openings 11*c*1,12*c*1 of the upper flanges 11*c*,12*c*, the welding work between the upper faces of the upper flanges 11*c*,12*c* and the side walls 6,7, the welding work between the front end faces of the upper flanges 11*c*, 12*c* and the side walls of the side plates 6,7, and the welding work between the lower faces of the upper flanges 11*c*,12*c* and the side walls of the side walls 6,7. By performing these welding work, high joint strength can be assured, and hence, a stable swing frame can be assured.

As the openings 11*c*1, 12*c*1 in the front end portions of the upper flanges 11*c*, 12*c* are formed in the turned, square U shape as viewed in plan, the side plates 6,7 can be brought into close contact with the walls of the openings 11*c*1, 12*c*1 when the side plates 6,7 are inserted into the openings 11*c*1,12*c*1. It is, therefore, possible to increase the positioning accuracy between the upper flanges 11*c*, 12*c* and the side plates 6,7, thereby making it possible to assure a swing frame of high fabrication accuracy.

Owing to the formation of the front end portions of the upper flanges 11c, 12c in tapered shapes as viewed in plan, it is possible to reduce the concentration of a stress at the welded portion 17 and the like between the front end portions of the upper flanges 11c, 12c and the side plates 6,7, thereby making it possible to provide a stable welded structure.

The invention claimed is:

1. A swing frame structure for construction machinery, said swing frame structure being arrangeable in a swing upperstructure and having a center frame composed of side plates and a reinforcement plate joined to each other, wherein:

said swing frame structure is provided with mating portions for bringing said side plates and said reinforcement plate into engagement with each other such that said side plates and said reinforcement plate are positioned relative to each other, and further wherein said mating portions comprise lug and hole joints, respectively, and said lug and hole joints comprise holes formed through said side plates and lugs formed on said reinforcement plate such that said lugs can be inserted into said holes, respectively; and wherein said side plates are each provided with a lifting hole for enabling to lift said construction machinery, a hole for a boom foot pin and a hole for a boom cylinder pin, and said holes in each of said side plates are each formed at a position below a line connecting a center of the corresponding hole for said boom foot pin with a center of the corresponding lift hole but above a line connecting a center of the corresponding hole for said boom cylinder pin and said center of the corresponding lift hole.

2. A swing frame structure for construction machinery, said swing frame structure being arrangeable in a swing upperstructure and having a center frame composed of side plates and a bottom plate joined to each other, wherein:

said swing frame structure is provided with mating portions for bringing said side plates and said bottom plate into engagement with each other such that said side plates and said bottom plate are positioned relative to each other, and further wherein said mating portions comprise lug and hole joints, respectively, and said lug and hole joints are positioned on a side outside of a swing-wheel-mounting surface, and said lug and hole joints comprise holes formed through said bottom plate and lugs formed on said side walls such that said lugs can be inserted into said holes, respectively; and said side plates are arranged in a pair and opposite said bottom plate, said lugs are formed on said side plates, respectively, and said holes in which said lugs are to be inserted are formed through said bottom plate.

3. A swing frame structure for construction machinery, said swing frame structure being arrangeable in a swing upperstructure and being composed of a tail frame including frame members with upper flanges and a center frame including side plates, said upper flanges of said frame member and said side plates having been joined to each other by welding, wherein:

said upper flanges of said frame members are provided with openings formed at front end portions thereof, and said side plates are inserted in said openings, respectively, and said side plates are provided with stepped portions at portions thereof which are facing said openings of said upper flanges, respectively, and a height dimension of an upper step face and a lower step face, between which said stepped portion of each side plate is defined, is set greater than a thickness dimension of the corresponding one of said upper flanges.

4. A swing frame structure according to claim 3, wherein weld portions are formed between said stepped portions of said side plates and walls of said openings of the corresponding upper flanges, between the upper faces of said upper flanges and side walls of the corresponding side plates, between front end faces of said upper flanges and said side walls of the corresponding side plates, and between lower faces of said upper flanges and said side walls of the corresponding side plates, respectively.

5. A swing frame structure according to claim 3, wherein said openings are each formed in a turned, square U shape as viewed in plan.

6. A swing frame structure according to claim 3, wherein said front end portion formed in said front end portion of each of said upper flanges is formed in a tapered shape as viewed in plan.

* * * * *